United States Patent
Tagawa

(10) Patent No.: US 11,828,888 B2
(45) Date of Patent: Nov. 28, 2023

(54) RADIATION IMAGING APPARATUS

(71) Applicant: CANON KABUSHIKI KAISHA, Tokyo (JP)

(72) Inventor: Motoki Tagawa, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 17/060,906

(22) Filed: Oct. 1, 2020

(65) Prior Publication Data
US 2021/0103062 A1    Apr. 8, 2021

(30) Foreign Application Priority Data
Oct. 7, 2019   (JP) ................................ 2019-184688

(51) Int. Cl.
*G01T 1/17* (2006.01)
*H04N 5/32* (2023.01)
*H04N 25/63* (2023.01)
*G01T 1/175* (2006.01)

(52) U.S. Cl.
CPC .................. *G01T 1/17* (2013.01); *H04N 5/32* (2013.01); *H04N 25/63* (2023.01); *G01T 1/175* (2013.01)

(58) Field of Classification Search
CPC ............. G01T 1/17; G01T 1/175; H04N 5/32; H04N 5/361
See application file for complete search history.

(56) References Cited

U.S. PATENT DOCUMENTS

| 10,498,975 | B2 | 12/2019 | Tezuka | |
|---|---|---|---|---|
| 2005/0078793 | A1* | 4/2005 | Ikeda | A61B 6/00 378/98.8 |
| 2017/0272670 | A1* | 9/2017 | Tezuka | H04N 5/32 |
| 2018/0070895 | A1* | 3/2018 | Kravis | A61B 6/54 |
| 2018/0275075 | A1* | 9/2018 | Tamura | G06T 5/50 |
| 2018/0292545 | A1* | 10/2018 | Asai | H02J 7/0068 |
| 2019/0302278 | A1 | 10/2019 | Tamura | |

FOREIGN PATENT DOCUMENTS

| JP | 2006-250728 A | 9/2006 | |
|---|---|---|---|
| JP | 2012183241 A | 9/2012 | |
| JP | 2013118983 A | 6/2013 | |
| JP | 2014230636 A * | 12/2014 | ............... A61B 6/03 |
| JP | 2016095278 A | 5/2016 | |
| JP | 2017148400 A * | 8/2017 | ............... A61B 6/00 |
| JP | 2018091689 A | 6/2018 | |
| JP | 2018-157939 A | 10/2018 | |
| JP | 2018175080 A | 11/2018 | |
| JP | 2019-136402 A | 8/2019 | |

\* cited by examiner

*Primary Examiner* — David P Porta
*Assistant Examiner* — Casey Bryant
(74) *Attorney, Agent, or Firm* — CANON U.S.A., INC. IP Division

(57) ABSTRACT

A radiation imaging apparatus that is used in a radiation imaging system. The radiation imaging apparatus includes an image capturing unit configured to output an image signal based on radiation transmitted through an object and offset data which is acquired by a plurality of acquisition modes and used for correcting the image signal, and a determination unit configured to determine which of a plurality of waiting modes is to be used to make the image capturing unit wait. The determination unit makes a determination based on the acquisition mode of the offset data.

20 Claims, 6 Drawing Sheets

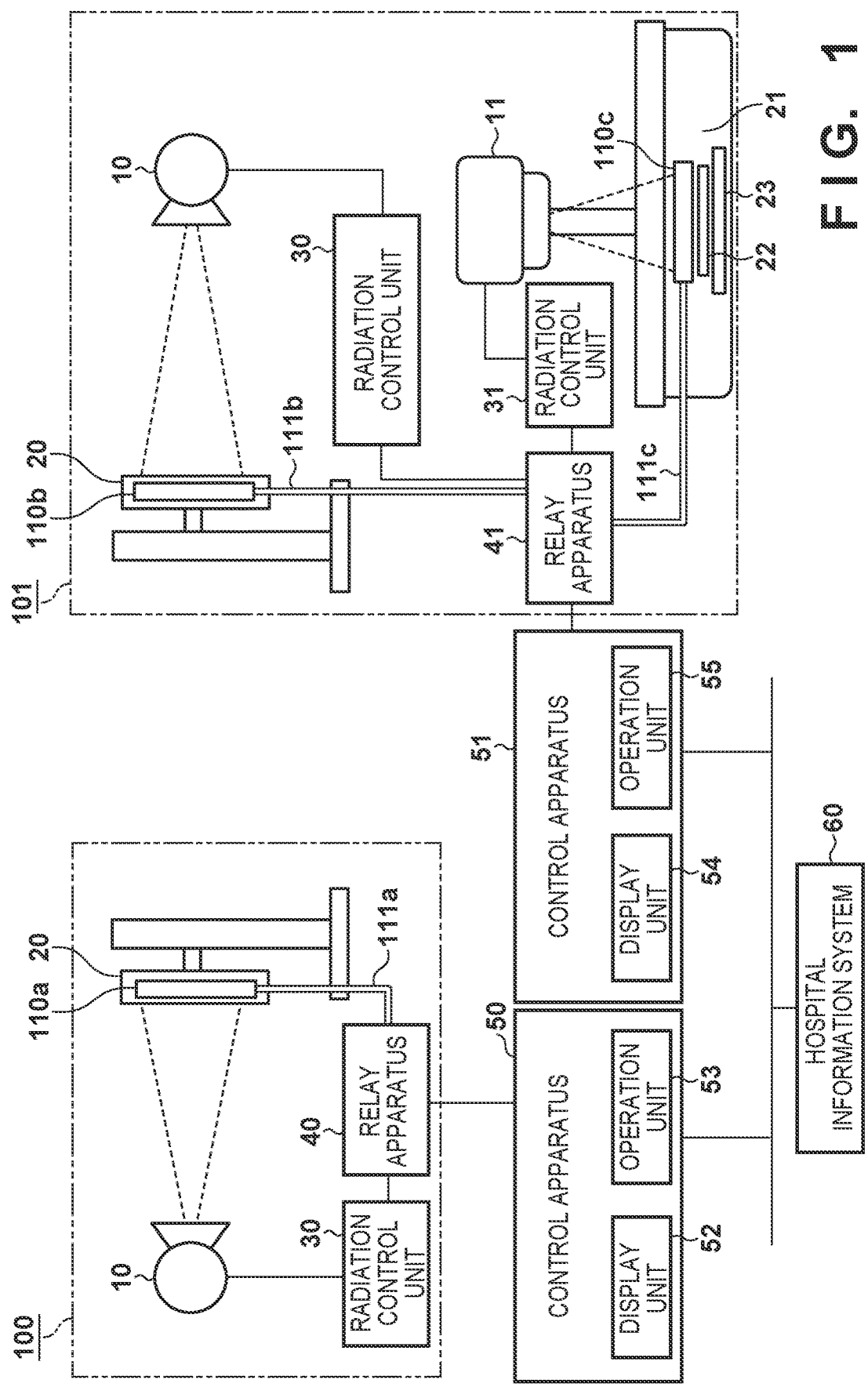

RADIATION IMAGING APPARATUS

BACKGROUND OF THE DISCLOSURE

Field of the Disclosure

The aspect of the embodiments relates to a radiation imaging apparatus.

Description of the Related Art

As a radiation imaging apparatus that captures a radiation image by using radiation (X-rays or the like) transmitted through an object, there is a radiation imaging apparatus that can display a captured radiation image in real time. There is also a radiation image that uses an FPD (Flat Panel Detector).

An FPD detects, as the amount of charges, the dose of radiation emitted during an arbitrary accumulation period. Hence, if charges unrelated to radiation irradiation are present in a radiation detector when a radiation image of an object is captured, these charges will be superimposed as noise on the radiation image, and the image quality of the radiation image will be degraded. Examples of this noise are noise caused by a dark current (charges) generated in the radiation detector mainly due to temperature influence and fixed noise caused by a defect unique to the radiation detector. When a radiation image of an object is to be captured, offset correction is performed to correct the above-described noise components.

In general, offset correction is performed by setting, as offset data for correction, image data (to be referred to as "non-exposure image data" hereinafter) acquired by performing image capturing in a state without radiation irradiation, and subtracting the offset data from the radiation image acquired by the image capturing operation. As offset data acquisition methods, a method (to be referred to as "intermittent dark" hereinafter) of acquiring the non-exposure image data immediately after or immediately before each image capturing operation of the object and a method (to be referred to as "fixed dark" hereinafter) of acquiring the non-exposure image data in advance before the image capturing operation of the object are known.

Fixed dark is a method suitable for moving-image capturing since one of the merits of fixed dark is that a high frame rate can be implemented. On the other hand, if the temperature of the radiation imaging apparatus changes between the time of offset data acquisition without exposure and the time of the actual image capturing operation, the accuracy of the correction by offset data will decrease since the noise generated by dark current will change. Hence, it is better to minimize the temperature change of the radiation imaging apparatus when imaging capturing is to be performed by fixed dark. The temperature change of the radiation imaging apparatus can be mainly caused by the change in the heating value of the radiation imaging apparatus due to a change in the frame rate during a continuous image capturing operation, a change in the ratio of the waiting time and the image capturing operation time, and the like.

Japanese Patent Laid-Open Nos. 2016-95278 and 2018-91689 disclose techniques in which the temperature for controlling the imaging operation is driven to be constant so as to suppress the above-described change in the heating value. In addition, Japanese Patent Laid-Open Nos. 2012-183241 and 2018-175080 disclose that the offset data will be acquired after the image capturing operation of the object in cases such as when there is time variation in the captured image, when power supply is being performed from a battery, and the like.

In recent years, since radiation imaging apparatuses have become easily portable due to advancements in weight reduction techniques and wireless techniques, a single radiation imaging apparatus is often shared and used among different radiation imaging systems. If the waiting mode is fixed in accordance with this, the waiting mode for suppressing temperature change will be constantly executed even when still-image capturing or low frame rate image capturing is to be performed, thereby generating inconveniences such as a reduction in the life of components due to the temperature, wasteful energy consumption, and the like.

SUMMARY OF THE DISCLOSURE

The aspect of the embodiments has been made in consideration of the above situation, and provides a radiation imaging apparatus advantageous in suppressing the life of components from decreasing and power consumption from increasing.

According to an aspect of the embodiments, the disclosure provides an imaging apparatus comprising a radiation imaging apparatus that is used in a radiation imaging system, comprising: an image capturing unit configured to output an image signal based on radiation transmitted through an object and offset data which is acquired by a plurality of acquisition modes and used for correcting the image signal; and a determination unit configured to determine which of a plurality of waiting modes is to be used to make the image capturing unit wait, wherein the determination unit makes a determination based on the acquisition mode of the offset data.

Further features of the disclosure will become apparent from the following description of exemplary embodiments with reference to the attached drawings.

BRIEF DESCRIPTION OF THE DRAWINGS

FIG. 1 is a general schematic view of a radiation imaging system;

DESCRIPTION OF THE EMBODIMENTS

Figure 2A:
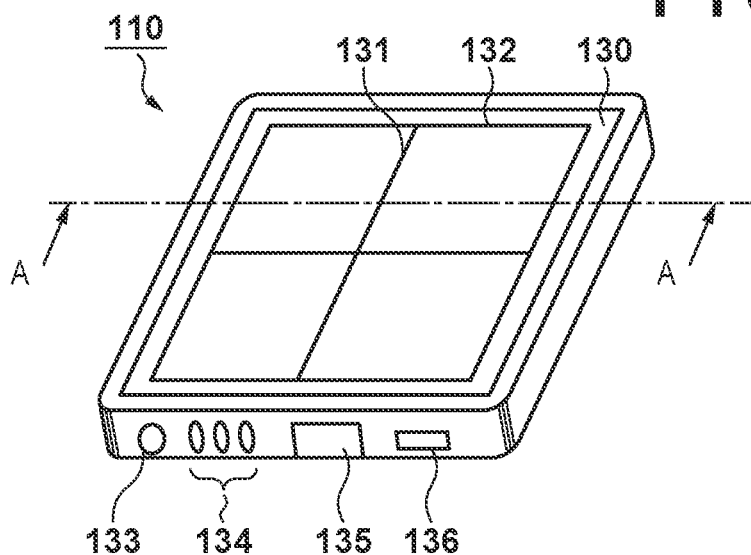
FIGS. 2A to 2C are schematic views of a radiation imaging apparatus.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

In this specification, radiation includes, in addition to X-rays, α-rays, β-rays, γ-rays, particle beams, cosmic rays, and the like.

First Embodiment

An overview of a radiation imaging system according to the aspect of the embodiments will be described first with reference to FIG. 1. An example in which the radiation imaging system includes a radiation imaging system for still-image capturing and a radiation imaging system capable of moving-image capturing and these systems are connected by a network will be described.

In such a system, an inspection by radiation imaging is generally performed based on an inspection order delivered from a hospital information system 60. The inspection order includes inspection information which includes the inspection contents. Image capturing protocol information is also included in this inspection information when radiation imaging is to be performed. The image capturing protocol information defines parameter information to be used at the time of image capturing or at the time of image processing, information related to the execution method of image capturing, and information concerning the type of sensor to be used for image capturing or the image capturing environment such as the attitude at which the image capturing will be performed with respect to an inspection target, and the like. The inspection information also includes information, such as an inspection ID, a reception number, and the like, for specifying an inspection order or an image captured in accordance with the inspection order.

This embodiment will exemplify a case in which there are radiation imaging rooms 100 and 101 where radiation imaging is to be performed and two control apparatuses 50 and 51 that control apparatuses in the radiation imaging room 100 and radiation imaging room 101. In this embodiment, radiation imaging apparatus 110 is described as radiation imaging apparatuses 110a, 110b, and 110c. The control apparatuses 50 and 51 are connected to the hospital information system 60 via a network and can accept an inspection order.

In the radiation imaging room 100, still-image capturing is performed under the control of control apparatus 50. The radiation imaging room 100 includes a radiation source 10, the radiation imaging apparatus 110a, a holder 20, a radiation control unit 30, a relay apparatus 40, and a cable 111a. The radiation source 10 generates radiation. For example, the radiation source 10 is an X-ray tube in this embodiment, and emits radiation (X-rays in this case) to an object. In this case, assume that the radiation source 10 is a type of radiation source that supports only still-image capturing and does not support moving-image capturing which requires radiation irradiation to performed over a long period.

The radiation imaging apparatus 110a generates an image signal by detecting the radiation transmitted through an object as charges corresponding to a transmitted radiation dose. The acquired image signal is transferred to the control apparatus 50 via the cable 111a and the relay apparatus 40. The image signal can also be transferred by wireless communication without the intervention of the cable. Power can also be supplied to the radiation imaging apparatus 110a via the cable 111a.

The holder 20 holds the radiation imaging apparatus 110a. The holding portion can be moved vertically to change the position of the radiation imaging apparatus 110a in accordance with the object.

The relay apparatus 40 includes a circuit that mediates communication between the radiation imaging apparatus 110a and the radiation control unit 30, and can relay synchronization signals and the like for synchronizing an image capturing operation. The relay apparatus 40 can also monitor the states of the radiation imaging apparatus 110a and the radiation control unit 30 to adjust, for example, the radiation irradiation timing of the radiation source 10 in accordance with the state of the radiation imaging apparatus 110a. Furthermore, the relay apparatus is also connected to the control apparatus 50 and can relay the exchange of various kinds of control signals and information.

The radiation control unit 30 controls the radiation generation based on the image capturing protocol in accordance with the control by the control apparatus 50. More specifically, the radiation control unit 30 applies a voltage to the radiation source 10 to cause the radiation source to generate radiation in accordance with imaging conditions (for example, parameter information such as a tube current, a tube voltage, and irradiation time) corresponding to the image capturing protocol.

The control apparatus 50 controls the radiation imaging processing based on the image capturing protocol. The control apparatus 50 may also be configured to perform image processing on the image signal acquired from the radiation imaging apparatus 110a. The image processing performed by the control apparatus 50 includes gradation processing, frequency processing, and the like, and is performed by using the parameter information included in the image capturing protocol information.

The control apparatus 50 includes a display unit 52 and an operation unit 53. The display unit 52 displays information about the system state and the like to an operator. The display unit 52 can display an inspection order received from an external apparatus or an inspection order created by the operator of the radiation imaging apparatus 110a. The operation unit 53 acquires instructions from the operator. The operation unit 53 can be, for example, a keyboard, a mouse, a touch panel, or various kinds of buttons. For example, the operator can input an instruction to the radiation imaging apparatus 110a via the operation unit 53.

In the radiation imaging room 101, moving-image capturing is performed in addition to still-image capturing under the control of the control apparatus 51. The radiation source 10, the radiation imaging apparatus 110b, the holder 20, the radiation control unit 30, a relay apparatus 41, and a cable 111b included in the radiation imaging room 101 are arranged to perform still-image capturing. The still-image capturing function is the same as that of the apparatuses included in the radiation imaging room 100. A radiation source 11, the radiation imaging apparatus 110c, a holder 21, a radiation control unit 31, the relay apparatus 41, and a cable 111c included in the radiation imaging room 101 are arranged to perform moving-image capturing. The radiation source 11 is arranged to support moving-image capturing and is able to perform radiation irradiation over a long period by including, for example, an internal heat releasing structure or the like.

The radiation imaging apparatus 110c generates an image signal by detecting the radiation transmitted through the object as charges corresponding to the transmitted radiation dose. When moving-image capturing is to be performed, the radiation imaging apparatus continuously generates image signals corresponding to a plurality of images, and transfers the sequentially acquired image signals to the control apparatus 51 via the cable 111c and the relay apparatus 41.

The holder 21 holds the radiation imaging apparatus 110c. The holder 21 includes a radiation shielding unit 23 that prevents the radiation undergoing the moving-image capturing operation from scattering outside the radiation imaging apparatus 110c after the radiation has been transmitted through the apparatus. The radiation shielding unit 23 is made of a high density material, for example, molybdenum, iron, lead, or the like. The radiation shielding unit 23 is arranged on a surface on the opposite side of the surface, through which the radiation enters, of the radiation imaging apparatus 110c. The holder 21 also includes a temperature rise suppression unit 22 to suppress the temperature of the radiation imaging apparatus 110c from rising. The temperature rise suppression unit 22 may cool the radiation imaging apparatus 110c by using, for example, an air cooling device, a water cooling device, or a Peltier element. A heat sink that has a thermal capacity may be thermally connected to the radiation imaging apparatus 110c to suppress the temperature from rising.

The relay apparatus 41 can relay both the communication between the radiation imaging apparatus 110b and the radiation control unit 30 and the communication between the radiation imaging apparatus 110c and the radiation control unit 31.

The control apparatus 51 controls both the image capturing by the radiation source 10 and the radiation imaging apparatus 110b and the image capturing by the radiation source 11 and the radiation imaging apparatus 110c in the radiation imaging room 101. The apparatus to be used can be selected based on whether the inspection order requires moving-image capturing.

The three radiation imaging apparatuses 110a, 110b, and 110c can be provided as the radiation imaging apparatuses 110 in correspondence with the locations where the radiation imaging apparatuses are to be installed. Also, one radiation imaging apparatus 110 can be transported around and connected to any of the cables 111a, 111b, and 111c so that one radiation imaging apparatus can be used in three locations. A communication unit which is capable of performing wireless communication can be included in each radiation imaging apparatus 110, and the radiation imaging apparatus 110 can exchange control signals such as a timing signal and the like and transfer image signals by wireless communication without the intervention of a cable.

Figure 2B:
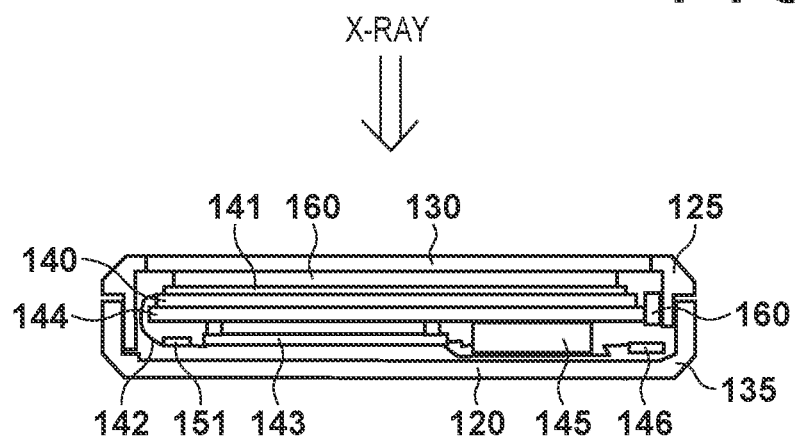
Figure 2C:
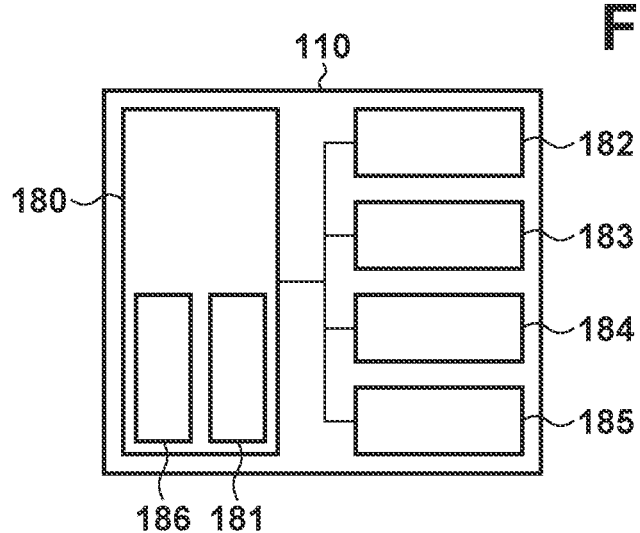

The structure of each radiation imaging apparatus 110 according to this embodiment will be described next with reference to FIGS. 2A to 2C. FIG. 2A is a view of the radiation imaging apparatus 110 according to this embodiment seen from the side of the radiation incident surface, and FIG. 2B is a sectional view of FIG. 2A taken along a line A-A. FIG. 2C is a schematic block diagram of the radiation imaging apparatus 110.

The housing of each radiation imaging apparatus 110 can be formed by a front housing 125, a rear housing 120, and a radiation transmitting plate 130. A low density material such as aluminum, magnesium, CFRP, or the like can be used for the front housing 125 and the rear housing 120 to ensure the apparatus will have the strength to withstand falls and impact and to reduce the weight of the apparatus for the purpose of decreasing the load during transportation. For example, CFRP or the like can be used for the radiation transmitting plate 130. Indices 132 and 131 that indicate the image capturing range and the center of the image capturing range of a sensor panel 140 may be displayed on the radiation transmitting plate 130. A switch 133, a state display unit 134, a window unit 135 for wireless communication, and a wired communication connection unit 136 are arranged on the side surface of each radiation imaging apparatus 110. A battery 145 for operating the radiation imaging apparatus 110 may be incorporated in each radiation imaging apparatus 110. The battery 145 can be formed to be easily attachable/detachable to/from the radiation imaging apparatus so as to allow replacement with another charged battery when the remaining charge amount is low.

Each radiation imaging apparatus 110 can perform image capturing by using the power supply voltage supplied from the battery 145, and perform wireless communication by using an antenna 146 incorporated in the self-apparatus via the window unit 135. The radiation imaging apparatus 110 can use wireless communication in this manner. In a case in which the wireless communication state is unfavorable, the radiation imaging apparatus 110 may perform wired communication by connecting to the corresponding cable 111 via the wired communication connection unit 136. Power supply to the radiation imaging apparatus 110 can be performed via wire in a case in which the remaining charge amount of the battery 145 is low.

The switch 133 can be used for the operation to power on/off the radiation imaging apparatus 110, the operation to switch image capturing enabled/disabled state (ready state), and the like. The state display unit 134 can display the power on/off states, the remaining charge amount of the battery 145, and the like by the color of the light, by lighting/flickering/turning off the light, and the like.

An image capturing unit that outputs an image signal, which is based on the radiation transmitted through an object, and offset data for correcting the image signal is arranged in each radiation imaging apparatus 110. The image capturing unit includes the sensor panel 140 on which a plurality of pixels, each including a photoelectric conversion element, have been formed on a glass substrate. In this embodiment, a scintillator 141 that converts the radiation into visible light can be arranged on a surface on the side of the photoelectric conversion elements of the sensor panel 140. CsI or the like can be used as the material of the scintillator 141. The scintillator 141 emits light upon receiving the radiation emitted onto the radiation imaging apparatus 110, and the light is converted into charges by each photoelectric conversion element of the sensor panel 140 and is output as an electrical signal from the corresponding pixel. This electrical signal is used to form an image signal.

The method of converting radiation into charges is not limited to that described above. For example, a direct conversion sensor such as a-Se or the like that directly converts radiation into charges may be used.

The electrical signal output from the sensor panel 140 is applied, via flexible board 142, to an integrated circuit 151 mounted on the flexible board 142. The integrated circuit 151 generates a digital signal by amplifying the electrical signal and performing A/D conversion on it. The image capturing unit may include the integrated circuit 151.

Furthermore, an image processing unit may be arranged on an electrical circuit board 143 so that gain correction, defect correction, offset correction, and the like will be performed on the digital signal. The offset correction is performed by setting, as offset data, image data (non-exposure image data) acquired by performing image capturing in a state without radiation irradiation, and subtracting the offset data from a radiation image. As a method of acquiring the offset data, a method (intermittent dark/first acquisition mode) of acquiring the offset data immediately after or immediately before each image capturing operation of the object and a method (fixed dark/second acquisition mode) of acquiring the offset data in advance before the image capturing operation of the object can be used in accordance with each order. For example, correction processing using offset data acquired by fixed dark can be performed in an image capturing operation that requires a high frame rate, and correction processing using offset data acquired by intermittent dark can be performed in a low frame rate image capturing operation or in still-image capturing. It may be set so that the offset correction will be performed by the external control apparatuses 50 and 51 of the radiation imaging apparatuses 110.

A base 144, which has rigidity on the side opposite to the radiation incident surface, is attached to the sensor panel 140 so as to prevent deformation and cracking that can occur due to a heavy load being placed from the outside, vibration during transportation, or the like. Also, a radiation shielding member (not shown) that has the role of suppressing radiation degradation of the electrical circuit board 143, removing scattered radiation from the rear of each radiation imaging apparatus 110, and the like can be attached to the base 144 as needed. The radiation shielding member is arranged on a surface on the opposite side of the side from which the radiation enters the radiation imaging apparatus. The radiation shielding member can be made of a high density material, for example, molybdenum, iron, lead, or the like. A cushioning material 160 is appropriately arranged between the internal members and the housing of the radiation imaging apparatus 110, and an effect of dispersing an external load and a cushioning effect against impact are acquired. For example, the cushioning material 160 can be made of silicone, a cellular material such as polyurethane materials, a material made of silicone gel, or the like.

Each radiation imaging apparatus 110 can include an image capturing unit 182, an image processing unit 183, a communication unit 184, a power supply unit 185, and a control unit 180 for controlling these units. The communication unit 184 can communicate with the radiation control unit and the control apparatus of each radiation imaging system. The power supply unit 185 may include the battery 145. The control unit 180 can include a determination unit 181 which determines the waiting mode to be used during a waiting operation and a temperature detection unit 186 for detecting the internal temperature of the radiation imaging apparatus 110.

Figure 3:
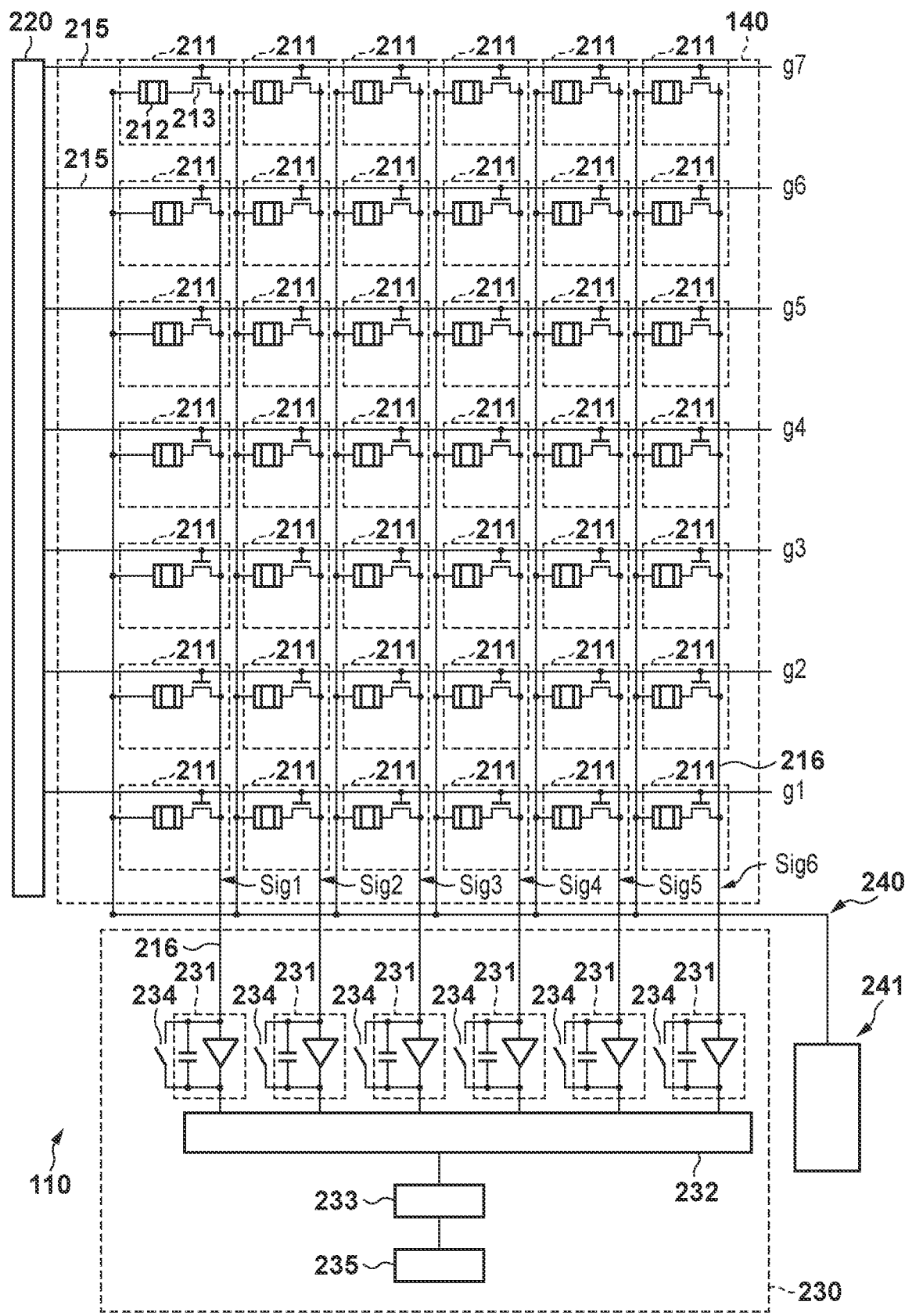
FIG. 3 is a schematic view of the circuit arrangement of the radiation imaging apparatus.

The circuit arrangement of each radiation imaging apparatus 110 will be described next with reference to FIG. 3. A plurality of pixels 211 for acquiring a radiation image are two-dimensionally arranged so as to form an array having a plurality of rows and a plurality of columns on the sensor panel 140. Note that although only seven (rows)×six (columns) of pixels and six column signal lines 216 are shown for the sake of descriptive convenience in FIG. 3, there may be six or more column signal lines in practice. For example, the pixel count of each radiation imaging apparatus may be 2,800 (rows)×2,800 (columns).

Each pixel 211 includes a conversion element 212 that converts the radiation into charges and a switch 213. The conversion element 212 may be formed by a photoelectric conversion element and the scintillator 141 as described above or may be formed by an element that directly converts the radiation into charges. The conversion element 212 can include a first electrode (to be also referred to as an individual electrode or a readout electrode) and a second electrode (to be also referred to as a common electrode). The switch 213 can be, for example, a thin-film transistor (TFT). The first electrode is connected to one main terminal of the switch 213 and the other main terminal is connected to the corresponding one of the column signal lines 216 denoted as Sig1 to Sig6. The control terminal (gate) of the switch 213 is connected to the corresponding one of the row selection lines 215. The second electrode of the conversion element 212 is connected to a bias line 240 for applying a bias voltage to each conversion element 212.

A bias voltage is supplied from a power supply unit 241 to the bias line 240. The bias voltage is supplied to the common electrode of each conversion element 212 arranged in an array via a corresponding bias line, in the column direction, branching from the bias line 240, in the row direction, for each column.

The radiation imaging apparatus 110 further includes a row selection unit 220 and a processing unit 230. The row selection unit 220 selects a row by driving the row selection line 215 of the row, among the plurality of row selection lines 215 denoted as g1 to g7, to the active level. When the row selection line 215 is set to the active level, each switch 213 connected to the row selection line 215 is set in a conductive state, and the first electrode of each conversion element 212 of the selected row is connected to the corresponding column signal line 216. A signal accumulated in the conversion element can be read out to the corresponding column signal line 216 from each conversion element of the selected row. A plurality of rows can be selected at once to perform binning and read out signals from a plurality of pixels.

The processing unit 230 can include amplification units 231, a multiplexer 232, an A/D converter 233, reset switches 234, and an computation unit 235. The processing unit 230 can be implemented in the integrated circuit 151. Each amplification unit 231 amplifies (detects) an electrical signal output to the corresponding column signal line 216. The amplification unit 231 can be, for example, an integrating amplifier. For example, one amplification unit 231 is arranged for each column signal line 216, and a plurality of amplification units 231 are arranged in the processing unit 230. Each reset switch 234 is used for resetting the corresponding amplification unit 231 by short-circuiting the input terminal and the output terminal of the amplification unit 231 and for resetting the potential of the corresponding column signal line 216.

The multiplexer 232 sequentially selects the plurality of amplification units 231 and outputs the output from each selected amplification unit 231 to the A/D converter 233. The A/D converter 233 converts the signal (analog signal) output from the multiplexer 232 into a digital signal. The computation unit 235 processes the digital signal output from the A/D converter 233 and outputs the processed result to the outside. The computation unit 235 may also directly output the digital signal output from the A/D converter 233. The amplification units 231, the multiplexer 232, the A/D converter 233, and the computation unit 235 may be mounted on or arranged separately from the integrated circuit 151.

Figure 4:
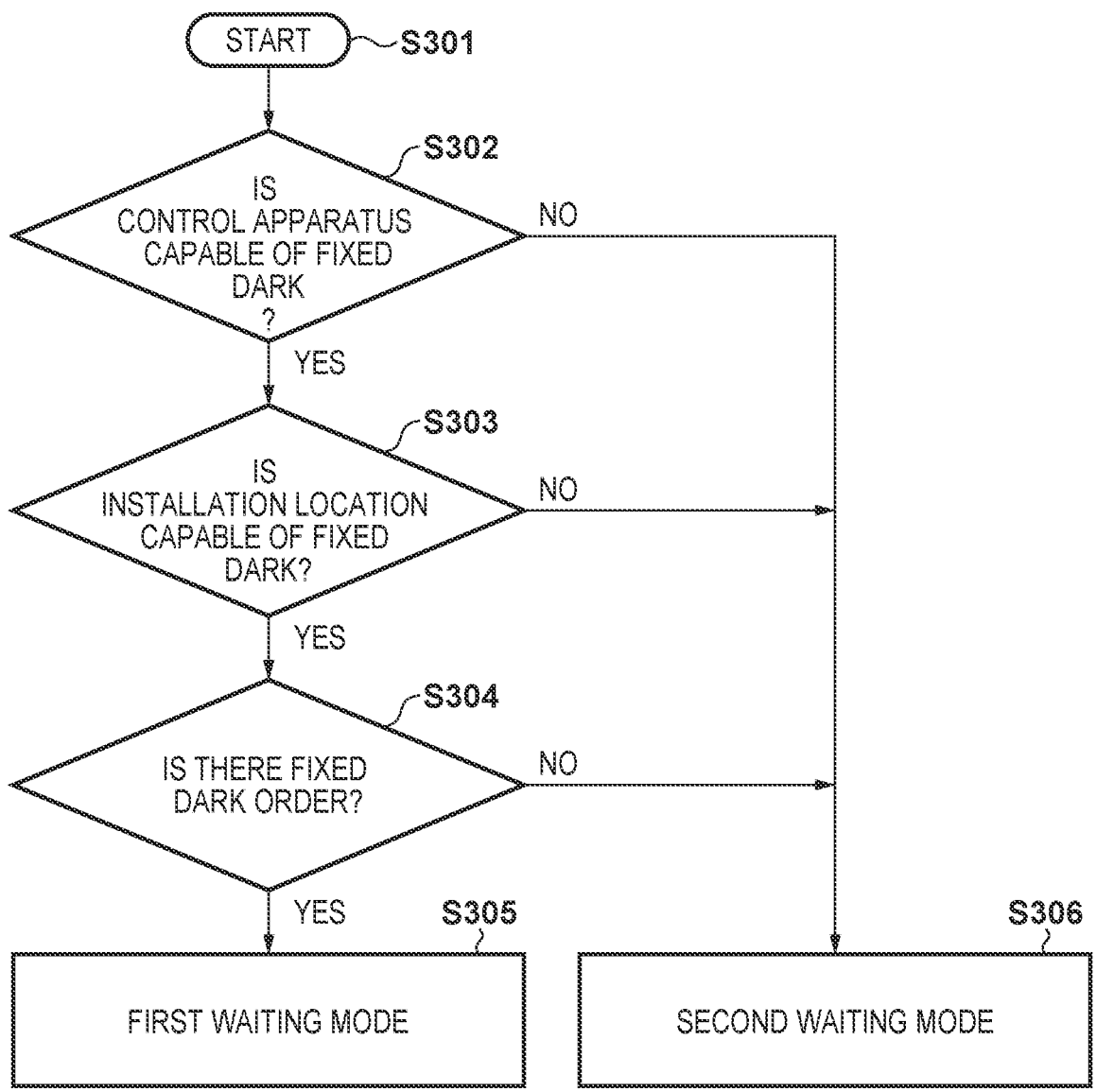
FIG. 4 is a flowchart for determining a waiting mode.

The waiting state of the radiation imaging apparatus 110 will be described with reference to FIG. 4. The radiation imaging apparatus 110 is driven by a predetermined driving mode during the waiting state when an image capturing operation is not being performed. The driving mode of the waiting state includes a first waiting mode in which driving is performed to maintain the internal temperature of the radiation imaging apparatus 110 at a constant temperature and a second waiting mode which has lower power consumption than the first waiting mode. In the first waiting mode, the power consumption at the time when the driving for a waiting operation is performed and the power consumption at the time of an image capturing operation are made approximately the same by causing, in a state in which an image capturing operation is not being performed, the integrated circuit 151 to perform an amplification operation and an A/D conversion operation in the same manner as when the image capturing operation is being performed. The circuits to be operated are not limited to the amplification operation and the A/D conversion operation of the integrated circuit 151. The multiplexer 232 and the computation unit 235 may also be operated. In addition, an amplifier (not shown) and a switch (not shown) arranged in each pixel 211 may also be operated, and a dedicated circuit for raising the temperature may also be included.

When offset correction is to be performed by fixed dark, the accuracy of the offset correction will decrease because the dark current noise will change if the temperature of the radiation imaging apparatus changes between the time of non-exposure image data acquisition and the time of the radiation image acquisition. Hence, by making the image capturing unit wait by the first waiting mode for maintaining a constant temperature, changes in the temperature and the power consumption can be suppressed even when the image capturing operation is started. Therefore, a good image can be acquired. On the other hand, the second waiting mode for power saving sets the radiation imaging apparatus 110 in a suppressed power consumption state in a state in which an image capturing operation is not being performed. In the second waiting mode, the power supply to the integrated circuit 151 may be stopped, the voltage to be supplied may be decreased, the clock may be stopped, or the clock frequency may be reduced. Note that the integrated circuit 151 may partially operate. The temperature rise in the radiation imaging apparatus 110 can be suppressed in the second waiting mode. Which of the waiting modes is to be used to drive the radiation imaging apparatus will be determined by the determination unit 181 of the control unit 180, which is, for example, provided in the electrical circuit board 143, in accordance with the determination procedure to be described below. A determination can also be performed by using an identification unit of the radiation imaging apparatus 110 to identify the arrangement of the radiation imaging system such as the environment in which the control apparatus 50 and the radiation imaging apparatus 110 are installed.

The waiting mode determination at the time of the waiting state is started when the radiation imaging apparatus 110 is installed and the power is turned on (step S301). In step S302, whether the radiation imaging system to which the radiation imaging apparatus 110 is connected is capable of performing image capturing by fixed dark is determined. If it is determined that image capturing by fixed dark can be performed, the process advances to step S303. If it is determined that image capturing by fixed dark cannot be performed, the process advances to step S306. For example, in a case in which the radiation imaging apparatus is connected to the control apparatus 50 shown in FIG. 1, the process will advance to step S306 to perform the second waiting mode since only still-image capturing will be performed. In a case in which the radiation imaging apparatus 110 is connected to the control apparatus 51, the process will advance to step S303 since there is a possibility that moving-image capturing using fixed dark will be performed. Whether image capturing by fixed dark can be performed by each control apparatus can be set in advance in the storage unit of each control apparatus, and a determination may be performed in accordance with the connection of the radiation imaging apparatus 110. Whether image capturing by fixed dark can be performed by each control apparatus may also be set in advance in the storage unit of each radiation imaging apparatus 110, and the determination unit 181 may make a determination by identifying which control apparatus has been connected.

In step S303, whether image capturing by fixed dark can be performed in the environment where the radiation imaging apparatus 110 is installed is determined. If it is determined that image capturing by fixed dark can be performed, the process advances to step S304. If it is determined that image capturing by fixed dark cannot be performed, the process advances to step S306. For example, since only the image capturing by intermittent dark will be performed when the radiation imaging apparatus 110 is connected to the cable 111b in FIG. 1, the process will advance to step S306. Since there is a possibility that moving-image capturing using fixed dark will be performed when the radiation imaging apparatus is connected to the cable 111c, the process will advance to step S304. The radiation imaging apparatus 110 may be set in advance to determine, whether image capturing by fixed dark can be performed, based on the pin arrangement of the connector of the cable, the pin shape, the voltage applied from the cable, or the pin voltage state. Also, in a case in which the radiation imaging apparatus 110 is to be used in a wireless state without being incorporated in the holder 20 or 21, the functions of the radiation shielding unit 23 and the temperature rise suppression unit 22 of the holder 21 will not be present. Hence, it may be determined that moving-image capturing will be difficult to perform, and the process may advance to step S306.

In addition, whether image capturing by fixed dark can be performed via the cable to be connected can be set in advance in the storage unit of the relay apparatus 41, the control apparatus 51, or each radiation imaging apparatus 110. For example, whether to use fixed dark or intermittent dark may be set in advance by a selection switch in the relay apparatus 41. The determination of the installation location of each radiation imaging apparatus 110 is not limited to the determination based on the type of the connected cable. For example, a proximity detection unit based on a short-range wireless communication unit or a magnetic sensor unit can be arranged in each holder so that the radiation imaging apparatus 110 can identify the holder in which the self-apparatus is installed and make a determination based on the information concerning the type of the holder set in advance in each radiation imaging apparatus. A camera can be included so that identification can be performed by using the camera. In this manner, each radiation imaging apparatus 110 can determine the waiting mode in accordance with the function and the environment of the image capturing system in which the self-apparatus is installed.

In step S304, whether an image capturing operation by fixed dark is present among the scheduled inspection orders determined. If it is determined that an image capturing operation by fixed dark is scheduled, the process advances to step S305. Otherwise, the process advances to step S306. The determination may not be based on all of the inspection orders, but may also be based on only the inspection orders scheduled within a predetermined time. If the process advances to step S306 from step S302, S303, or S304, the radiation imaging apparatus 110 waits in the second waiting mode for power saving until the image capturing operation. On the other hand, if the process advances to step S305, the radiation imaging apparatus 110 is driven to wait in the first waiting mode to maintain the same temperature as the temperature during image capturing in preparation for image capturing by fixed dark.

This processing procedure is started (step S301) not only when the radiation imaging apparatus 110 is powered on. This processing procedure may be started at the timing when the control apparatus to which the radiation imaging apparatus 110 is connected has changed, when the installation location of the radiation imaging apparatus 110 has changed, when a new inspection order is scheduled, or the like. Also, not all of the determination steps shown in FIG. 4 need be performed, and it may be set so that the process will advance to step S305 or S306 based on only one of the determination steps.

Figure 5:
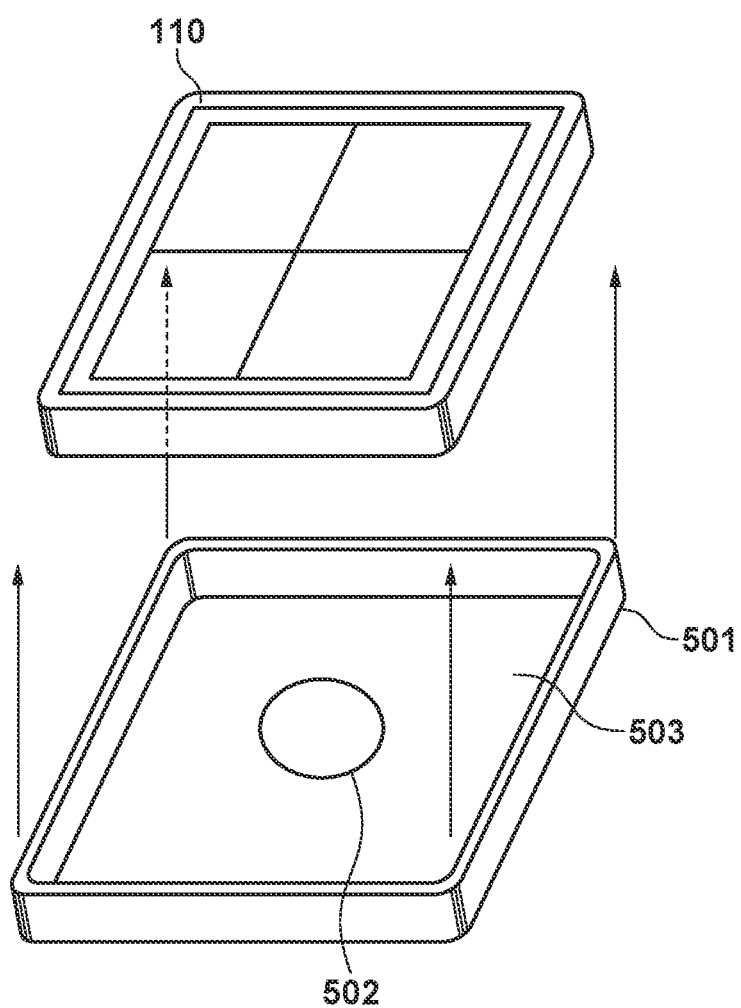
FIG. 5 is a schematic view of an external unit.

Although it has been described above that the second waiting mode will be used when the radiation imaging apparatus 110 is to be connected and used by wireless communication, an external unit 501 that allows the execution of image capturing by fixed dark when the radiation imaging apparatus 110 is connected by wireless communication will be described with reference to FIG. 5.

The external unit 501 is attached to the back surface of the radiation imaging apparatus 110. A radiation shielding unit 503 and a temperature rise suppression unit 502 are included in the external unit 501. Hence, moving-image capturing can be performed when the external unit 501 is attached to the radiation imaging apparatus 110. It may be set so that each radiation imaging apparatus 110 can determine whether the external unit 501 has been attached by arranging a notification unit based on short-range wireless communication or magnetism in the external unit 501 and arranging a corresponding reception unit or detection unit in the radiation imaging apparatus. Also, a switch which comes into contact or a protrusion portion which is pressed when the external unit 501 is attached can be arranged in the radiation imaging apparatus 110 so that the radiation imaging apparatus 110 can identify the attachment of the external unit 501. When the external unit 501 is attached, it will be determined in step S303 of FIG. 3 that fixed dark can be used. In this case, the waiting mode may be determined by also determining whether the radiation source which is capable of performing moving-image capturing is set in an operable state.

Figure 6:
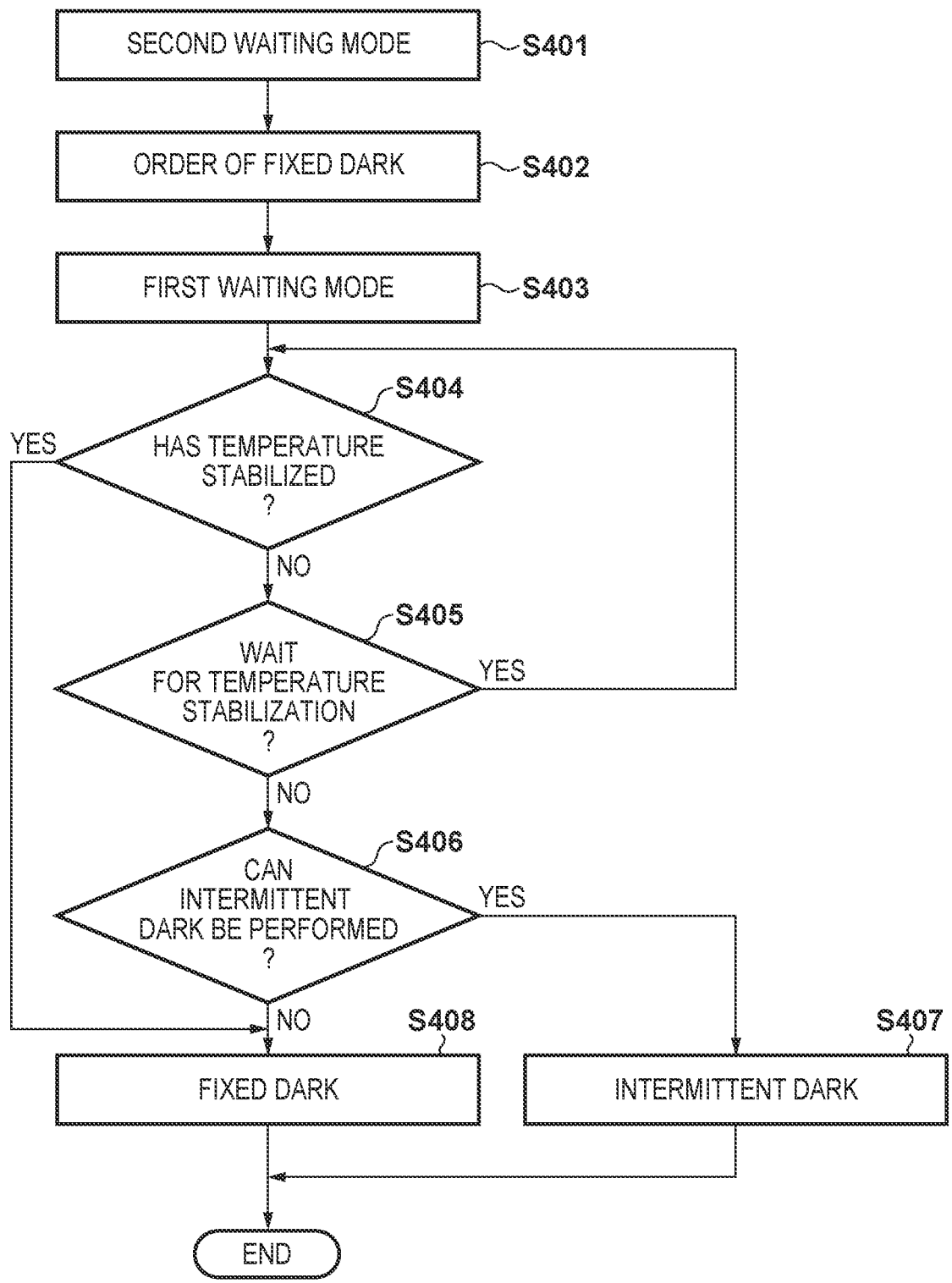
FIG. 6 is a flowchart showing the changing of the waiting mode.

The processing procedure performed when the radiation imaging apparatus 110 is being driven in the second waiting mode (step S401) and is switched to image capturing by fixed dark will be described with reference to FIG. 6. This processing procedure is applicable to, for example, a case in which the radiation imaging apparatus 110c has been set to a state to perform image capturing by intermittent dark based on the initial inspection order, but is instructed to perform moving-image capturing in the next inspection order. When an inspection order for image capturing by fixed dark is input (step S402) to the control apparatus 51 of the radiation imaging system during the second waiting mode, the waiting mode is switched (step S403) to the first waiting mode to maintain a constant temperature in accordance with the determination procedure of FIG. 5.

Subsequently, when image capturing by fixed dark is to be started, determination as to whether the temperature has been stabilized is performed in step S404. The temperature detection unit 186 detects the internal temperature of the radiation imaging apparatus 110. The control unit 180 can determine whether the temperature has stabilized based on the time since the driving by the second waiting mode has started, the difference of the non-exposure image data that has been acquired continuously is within a predetermined value, and the like. The determination can also be made by arranging a temperature sensor in the radiation imaging apparatus 110 and determining whether the temperature change is within a predetermined change width. If it is determined that the temperature has stabilized, the process advances to step S408. If it is determined that the temperature has not stabilized, the process advances to step S405.

In step S405, whether a waiting operation for temperature stabilization is to be performed is determined. If the temperature has not stabilized, the accuracy of correction processing based on offset data will decrease because the dark current noise will change during image capturing by fixed dark. However, if the operator determines, in accordance with the degree of urgency, that the waiting operation for temperature stabilization cannot be performed, the operator can input information from an operation unit 55 or the like of the control apparatus 51 so that the process can advance to step S406. If it is determined that the waiting operation for temperature stabilization can be performed, the process returns to step S404. An estimated time or the like until the temperature stabilizes can be displayed as a measure on a display unit 54 or the like of the control apparatus 51 to help the operator to make the determination.

In step S406, whether image capturing by intermittent dark can be performed is determined. The frame rate will decrease in image capturing by intermittent dark. If the operator determines that image capturing by intermittent dark is sufficient, the operator can input the information from the operation unit or the like of the control apparatus 51 so that the process can advance to step S407. If the operator determines that image capturing by intermittent dark cannot be permitted, the process advances to step S408. If the process advances to step S407, image capturing by intermittent dark is performed. If the process advances to step S408, image capturing by fixed dark is performed, and the image capturing operation ends (step S409).

As described above, when moving-image capturing is to be performed when the radiation imaging apparatus is waiting in the state of the second waiting mode for power saving, there may be predetermined constraints on the frame rate and the like. Hence, the waiting operation driving state is displayed, to the operator, on the display unit 54 of the control apparatus 51 or the state display unit 134 of the radiation imaging apparatus 110. The operator can switch the waiting mode as needed by using the operation unit 55 of the control apparatus 51 or the switch 133 of the radiation imaging apparatus 110. In this case, the waiting operation driving mode is determined by prioritizing the manual operation over the determination procedure described above.

According to this embodiment, in a radiation imaging apparatus that can perform offset correction processing by using two kinds of offset data, that is, fixed dark and intermittent dark, it is possible to suppress a reduction in the life of components due to temperature rise and an increase in waiting power due to wasteful energy consumption.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-184688, filed Oct. 7, 2019, which is hereby incorporated by reference herein in its entirety.

What is claimed is:

1. A radiation imaging apparatus that is used in a radiation imaging system, comprising:
   a radiation detector that outputs an analog signal, the radiation detector outputting the analog signal during radiography when irradiated from a radiation generator and during non-radiography when not irradiated from the radiation generator;
   a generation circuit that acquires the analog signal from the radiation detector and performs an operation to generate a digital signal based on the analog signal, wherein heat is created in the generation circuit due to the operation; and one or more controllers configured to:
pre-hold offset data based on the digital signal output from the generation circuit during the non-radiography, the pre-held offset data being used to correct image data which is generated based on the digital signal output the generation circuit during the radiography; and
control the generation circuit, based on information indicating that the pre-held offset data will be used to correct the image data to be acquired at the next radiography, such that the generation circuit performs the operation after obtaining the information and before the next radiography is started.

2. The apparatus according to claim 1, wherein controllers control the waiting mode of the generation circuit to the first or second waiting mode,
in the first waiting mode, the generation circuit performs the operation until the next radiography is started, and
in the second waiting mode, the generation circuit does not performs the operation until the next radiography is started.

3. The apparatus according to claim 2, wherein the controllers acquire the offset data in either first or second acquisition mode,
in the first acquisition mode, the controllers acquire the offset data each time immediately before or immediately after acquisition of the image data, and
in the second acquisition mode, the controllers acquire the pre-held offset data.

4. The apparatus according to claim 3, wherein the generation circuit performs an amplification operation and an A/D conversion operation.

5. The apparatus according to claim 4, wherein
in the case where the information indicating that the pre-held offset data will be used to correct the image data acquired at the next radiography is acquired, the controllers control the waiting mode of the generation circuit to the first waiting mode until the next radiography is started, and acquire the offset data for the next radiography in the second acquisition mode, and
in a case where the information indicating that the pre-held offset data will be used to correct the image data acquired at the next radiography is not acquired, the controllers control the waiting mode of the generation circuit to the second waiting mode until the next radiography is started, and acquire the offset data for the next radiography in the first acquisition mode.

6. The apparatus according to claim 5, wherein the second waiting mode has lower power consumption than the first waiting mode.

7. The apparatus according to claim 5, wherein in a case in which the radiation imaging system has an arrangement in which the offset data can be acquired by the second acquisition mode, the controllers determine to cause the generation circuit to wait in the first waiting mode.

8. The apparatus according to claim 5, wherein in a case in which the radiation imaging system has an arrangement to stably maintain a temperature of the image capturing unit, the controllers determine to cause the generation circuit to wait in the first waiting mode.

9. The apparatus according to claim 5, wherein in a case in which the radiation imaging system includes a radiation source that allows moving-image capturing, the controllers determine to cause the generation circuit to wait in the first waiting mode.

10. The apparatus according to claim 5, wherein in a case in which the radiation imaging system includes a temperature rise suppression device that suppresses a temperature rise in the radiation imaging apparatus, the controllers determine to cause the generation circuit to wait in the first waiting mode.

11. The apparatus according to claim 5,
wherein a communication interface configured to perform communication with the radiation imaging system, and
wherein in a case in which the communication interface is set to perform wireless communication, the controllers determine to cause the generation circuit to wait in the second waiting mode.

12. The apparatus according to claim 5, wherein in a case in which the radiation imaging system includes a radiation shielding member on a side opposite to the side in which the radiation enters the radiation imaging apparatus, the controllers determine to cause the generation circuit to wait in the first waiting mode.

13. The apparatus according to claim 5, wherein in a case in which the radiation imaging apparatus receives an instruction to acquire the offset data by the second acquisition mode when the generation circuit is waiting in the second waiting mode, the controllers determine to cause the generation circuit to wait in the first waiting mode.

14. The apparatus according to claim 5, further comprising:
a display device configured to perform display that a time until an internal temperature of the radiation imaging apparatus is stabilized in a case in which the internal temperature of the radiation imaging apparatus is not stable when the generation circuit is waiting in the first waiting mode.

15. The apparatus according to claim 5, wherein the radiation imaging apparatus identifies the acquisition mode of the offset data set in advance in the radiation imaging system in which the radiation imaging apparatus is installed, and the determination is performed based on the identified acquisition mode.

16. The apparatus according to claim 5,
wherein the controllers identify an installation location of the radiation imaging system, and
wherein the determination is performed based on information of the identified installation location.

17. The apparatus according to claim 16, wherein the controllers identify the installation location of the radiation imaging system based on location information acquired from at least one of a short-range wireless communication interface and a magnetic sensor.

18. The apparatus according to claim 5, wherein the controllers make the determination by detecting the arrangement of the radiation imaging system to which the radiation imaging apparatus is connected.

19. The apparatus according to claim 5, further comprising:
a display device configured to display which of the waiting modes has been determined by the controllers.

20. A control method of a radiation imaging apparatus that includes a radiation detector that outputs an analog signal, the radiation detector outputting the analog signal during radiography when irradiated from a radiation generator and during non-radiography when not irradiated from the radiation generator; a generation circuit that acquires the analog signal from the radiation detector and performs an operation to generate a digital signal based on the analog signal, wherein heat is created in the generation circuit due to the operation, the method comprising:
pre-holding offset data based on the digital signal output from the generation circuit during the non-radiography, the pre-held offset data being used to correct image data which is generated based on the digital signal output from the generation circuit during the radiography; and controlling the generation circuit, based on information indicating that the pre-held offset data will be used to correct the image data to be acquired at the next radiography, such that the generation circuit performs the operation after obtaining the information and before the next radiography is started.

\* \* \* \* \*